United States Patent
Dai et al.

(10) Patent No.: US 9,858,525 B2
(45) Date of Patent: Jan. 2, 2018

(54) SYSTEM FOR TRAINING NETWORKS FOR SEMANTIC SEGMENTATION

(71) Applicant: Microsoft Technology Licensing, LLC, Redmond, WA (US)

(72) Inventors: Jifeng Dai, Beijing (CN); Kaiming He, Beijing (CN); Jian Sun, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 64 days.

(21) Appl. No.: 14/883,372

(22) Filed: Oct. 14, 2015

(65) Prior Publication Data

US 2017/0109625 A1    Apr. 20, 2017

(51) Int. Cl.
  *G06K 9/62* (2006.01)
  *G06N 3/08* (2006.01)

(52) U.S. Cl.
  CPC ............. *G06N 3/08* (2013.01); *G06K 9/6264* (2013.01); *G06K 9/6273* (2013.01)

(58) Field of Classification Search
  CPC .. G06K 9/00771; G06K 9/629; G06K 9/6293; G06K 9/626
  USPC ....... 382/156, 157, 159, 170, 171, 282, 283; 128/925; 706/15, 16, 25
  See application file for complete search history.

(56) References Cited

U.S. PATENT DOCUMENTS

| | | | | |
|---|---|---|---|---|
| 6,728,404 B1 * | 4/2004 | Ono | ..................... | G06K 9/3241 382/118 |
| 7,062,085 B2 * | 6/2006 | Luo | ......................... | G06K 9/38 382/165 |
| 7,187,811 B2 * | 3/2007 | Lin | ....................... | G06T 3/4046 382/299 |
| 7,280,696 B2 * | 10/2007 | Zakrzewski | ....... | G06K 9/00771 382/218 |
| 7,302,101 B2 * | 11/2007 | Zakrzewski | ....... | G06K 9/00771 382/218 |
| 7,849,024 B2 * | 12/2010 | Lee | .......................... | G06T 5/00 382/155 |
| 7,912,288 B2 | 3/2011 | Winn et al. | | |
| 8,126,268 B2 * | 2/2012 | Rossato | ................... | G06K 9/38 382/173 |
| 8,345,944 B2 * | 1/2013 | Zhu | ......................... | G06K 9/38 378/98.12 |

(Continued)

OTHER PUBLICATIONS

Agrawal et al. "Analyzing the Preformance of Multilayer Neural Networks for Object Recognition," In Proceedings of 13th European Conference on Computer Vision, Sep. 6, 2014, 21 pages.

(Continued)

*Primary Examiner* — Yosef Kassa (57) ABSTRACT

Disclosed herein are technologies directed to training a neural network to perform semantic segmentation. A system receives a training image, and using the training image, candidate masks are generated. The candidate masks are ranked and a set of the ranked candidate masks are selected for further processing. One of the set of the ranked candidate masks is selected to train the neural network. The one of the set of the set of the ranked candidate masks is also used as an input to train the neural network in a further training evolution. In some examples, the one of the set of the ranked candidate masks is selected randomly to reduce the likelihood of ending up in poor local optima that result in poor training inputs.

20 Claims, 5 Drawing Sheets

(56) References Cited

U.S. PATENT DOCUMENTS

| | | | |
|---|---|---|---|
| 8,505,525 B2* | 8/2013 | Dobbins | F41A 19/12 124/71 |
| 8,675,943 B2* | 3/2014 | Zheng | G06T 7/11 382/131 |
| 2015/0104102 A1 | 4/2015 | Carreira et al. | |

OTHER PUBLICATIONS

Arbelaez et al., "Multiscale Combinatorial Grouping," In Proceedings of IEEE Conference on Computer Vision and Pattern Recognition, Jun. 24, 2014, 8 pages.

Carreira et al., "Semantic Segmentation with Second-Order Pooling," In Proceedings of 12th European Conference on Computer Vision, Oct. 7, 2012, 14 pages.

Chatfield et al., "Return of the Devil in the Details: Delving Deep into Convolutional Nets," In Proceedings of the British Machine Vision Conference, Sep. 1, 2014, 11 pages.

Chen, "Semantic Image Segmentation with Deep Convolutional Nets and Fully Connected CRFs," In Proceedings of 3rd International Conference on Learning Representations, May 7, 2015, 14 pages.

Cogswell et al., "Semantic segmentation with deep learning," Retrieved on: Jun. 5, 2015 Available at: http://sunw.csail.mit.edu/2014/papers2/12_Cogswell_SUNw.pdf.

Dai et al., "Convolutional Feature Masking for Joint Object and Stuff Segmentation," In Proceedings of IEEE Conference on Computer Vision and Pattern Recognition, Jun. 7, 2015, 10 pages.

Deng et al., "Imagenet: A Large-Scale Hierarchical Image Database," In Proceedings of IEEE Conference on Computer Vision and Pattern Recognition, Jun. 20, 2009, 8 pages.

Everingham et al., "The PASCAL Visual Object Classes (VOC) Challenge", In International Journal of Computer Vision, vol. 88, Issue 2, Jun. 2010, 36 pages.

Gidaris et al., "Object detection via a multi-region & semantic segmentation-aware CNN model," In Proceedings of Computer Vision and Pattern Recognition, May 2015, 17 pages.

Girshick et al., "Region-based convolutional networks for accurate object detection and segmentation," In Proceedings of IEEE Transactions on Pattern Analysis and Machine Intelligence, May 25, 2015, 16 pages.

Girshick et al., "Rich Feature Hierarchies for Accurate Object Detection and Semantic Segmentation," In Proceedings of IEEE Conference on Computer Vision and Pattern Recognition, Jun. 24, 2014, 21 pages.

Guillaumin et al., "Imagenet Autoannotation with Segmentation Propagation," In International Journal of Computer Vision, vol. 110, Issue 3, Apr. 7, 2014, 21 pages.

Hariharan et al., "Hypercolumns for Object Segmentation and Fine-Grained Localization," In Proceedings of Conference on Computer Vision and Pattern Recognition, Jun. 7, 2015, 10 pages.

Hariharan et al., "Semantic Contours from Inverse Detectors", In Proceedings of IEEE International Conference on Computer Vision, Nov. 6, 2011, 8 pages.

Hariharan et al., "Simultaneous Detection and Segmentation", In Proceedings of 13th European Conference on Computer Vision, Sep. 6, 2014, pp. 1-16.

He et al., "Delving Deep into Rectifiers: Surpassing Human-Level Performance on ImageNet Classification," In Proceedings of Computing Research Repository, Feb. 2015, pp. 1-11, 11 pages.

He et al., "Spatial Pyramid Pooling in Deep Convolutional Networks for Visual Recognition," In Proceedings of 13th European Conference on Computer Vision, Sep. 6, 2014, pp. 1-14, 14 pages.

Hou et al., "Efficient multiple instance convolutional neural networks for gigapixel resolution image classification," In Proceedings of Computing Research Repository, Apr. 2015, 9 pages.

Hsu et al., "Augmented Multiple instance regression for inferring object contours in bounding boxes," In Proceedings of IEEE Transactions on Image Processing, vol. 23, Issue 4, Apr. 2014, pp. 1722-1736. 15 pages.

Kohli et al., "Robust Higher Order Potentials for Enforcing Label Consistency," In International Journal of Computer Vision, vol. 82, Issue 3, May 2009, pp. 302-324, 32 pages.

Krahenbuhl et al., "Geodesic Object Proposals", In Proceedings of 13th European Conference on Computer Vision, Sep. 6, 2014, 15 pages.

Krizhevsky et al., "ImageNet Classification with Deep Convolutional Neural Networks," In Proceedings of Twenty-Sixth Annual Conference on Neural Information Processing Systems, Dec. 3, 2012, pp. 1-9, 9 pages.

Kuo et al., "DeepBox: Learning objectness with convolutional networks," In Proceedings of Computing Research Repository, May 8, 2015, 10 pages.

LeCun et al., "Backpropagation Applied to Handwritten Zip Code Recognition," In Journal of Neural Computation, vol. 1, Issue 4, Dec. 1989, pp. 541-551, 11 pages.

Liang et al., "Computational Baby Learning," In Journal of Computing Research Repository, Nov. 2014, 9 pages.

Lin et al., "Microsoft COCO: Common Objects in Context," In Proceedings of 13th European Conference on Computer Vision, Sep. 6, 2014, 14 pages.

Long et al., "Fully Convolutional Networks for Semantic Segmentation," In Proceedings of Computer Vision and Pattern Recognition, Jun. 7, 2015, 10 pages.

Mostajabi e al., "Feedforward semantic segmentation with zoom-out features," In Proceedings of Computing Research Repository, Dec. 2014, 11 pages.

Mottaghi et al., "The role of context for object detection and semantic segmentation in the wild," In IEEE Conference on Computer Vision and Pattern Recognition, Jun. 23, 2014, 8 pages.

Noh et al., "Learning deconvolution network for semantic segmentation," In Proceedings of Computing Research Repository, May 2015, 10 pages.

Ouyang et al., "DeepID-Net: Deformable deep convolutional neural networks for object detection," In Proceedings of Computing Research Repository, Dec. 2014, pp. 2403-2412. 10 pages.

Papandreou et al., "Modeling local and global deformations in deep learning: Epitomic convolution, multiple instance learning, and sliding window detection," In Proceedings of the IEEE Conference on Computer Vision and Pattern Recognition, Jun. 8, 2015, pp. 390-399. 10 pages.

Papandreou et al., "Weakly- and Semisupervised learnining of a deep convolutional network for semantic image segmentation," In Proceedings of Computing Research Repository, Feb. 2015, 10 pages.

Pinheiro et al., "From image-level to pixel-level labeling with convolutional networks," In Proceedings of the IEEE Conference on Computer Vision and Pattern Recognition, Jun. 7, 2015, 9 pages.

Rother et al., "'GrabCut'—Interactive foreground extraction using iterated graph cuts," In Journal of ACM Transactions on Graphics, vol. 23, Issue 3, Aug. 2004, 6 pages.

Russakovsky, "ImageNet Large Scale Visual Regonition Challenge," In Proceedings of Computing Research Repository, Sep. 2014, 43 Pages.

Sermanet et al., "OverFeat: Integated Recognition, Localization and Detection using Convolutional Networks," In Proceedings of International Conference on Learning Representations, Apr. 14, 2014, 16 pages.

Simonyan et al., "Very deep convolutional networks for large-scale image recognition," In Proceedings of 3rd International Conference on Learning Representations, May 7, 2015, 14 pages.

Szegedy et al., "Going deeper with convolutions," In Proceedings of Computer Vision and Pattern Recognition, Jun. 7, 2015, 12 pages.

Tsogkas et al., "Semantic part segmentation with deep learning," In Proceedings of Computing Research Repository, May 2015, 10 pages.

Uijlings et al., "Selective search for object recognition," In International Journal of Computer Vision, vol. 104, Issue 2, Apr. 2, 2013, 18 pages.

Wan et al., "End-to-end Integration of a convolutional network, deformable parts model and non-maximum in suppression," In Proceedings of Computing Research Repository, Nov. 2014, pp. 851-859. 9 pages.

(56) References Cited

OTHER PUBLICATIONS

Wang et al., "Transferring rich feature hierarchies for robust visual tracking," In Proceedings of Computing Research Repository, Jan. 2015, 9 pages.

Xia et al., "Semantic segmentation without annotating segments," n Proceedings of IEEE International Conference on Computer Vision, Dec. 1, 2013, 8 pages.

Zeiler et al., "Visualizing and understanding convolutional networks," In Proceedings of 13th European Conference on Computer Vision, Sep. 6, 2014, 11 pages.

Zhang et al., "Part-based R-CNNs for Fine-grained Category Detection," In Proceedings of 13th European Conference on Computer Vision, Sep. 6, 2014, 16 pages.

Zheng et al., "Conditional Random Fields as Recurrent Neural Networks," In Proceedings of Computing Research Repository, Feb. 2015, 16 pages.

Zhu et al., "segDeepM: Exploiting Segmentation and Context in Deep Neural Networks for Object Detection," In Proceedings of Computer Vision and Pattern Recognition, Jun. 2015, pp. 4703-4711. 9 pages.

* cited by examiner

SYSTEM FOR TRAINING NETWORKS FOR SEMANTIC SEGMENTATION

BACKGROUND

There are generally two ways to solve a recognition task as it relates to image detection. A first method is semantic segmentation. In semantic segmentation, a pre-defined class label is associated with each pixel in an image. The image is segmented into regions comprising the various objects defined by the class labels. In some examples, pixels can be classified with respect to their local features, such as color or texture. Another method to solve a recognition task is to use object detection. In object detection, bounding rectangles or boxes are used to segment objects from one another. In image recognition, a bounding box can be considered the smallest enclosing box within which all pixels of an object lie.

SUMMARY

Disclosed herein are technologies for training networks for semantic segmentation. Such techniques can be useful for increasing the accuracy of object identification in an image. Through a training process, images inputted into a network may have an increased level of semantic segmentation over similar but untrained networks. In some examples, a system can include a trainable neural network. The neural network can receive a training image as an input. The system can generate several candidate segment masks based on the training image. The candidate segment masks can be ranked from a relatively higher degree of accuracy to a relatively lower degree of accuracy to generate a ranked set of candidate segment masks. One or more masks of the ranked set of candidate segment masks are selected. One of the selected ranked set of candidate segment masks can be input into the neural network to train the neural network. The training process may continue for a desired number of times until the neural network can be trained to a desired level. In some examples, a desired level can be percentage overlap of bounding boxes generated by neural network from a sample image and the ground-truth bounding boxes for the same image. In another example, a desired level can be the percentage overlap of the semantic segmentation of an image performed by a neural network and a human classification of the same image.

In some examples, using a ground-truth bounding box as an input and generated candidate segment masks to train the neural network can reduce the workload of annotation training images for semantic segmentation. In some examples, spotting the ground-truth bounding box for the candidate segment mask generation can involve less computing resources compared to other technologies. In examples, the cost of training a neural network to perform semantic segmentation can be reduced, as the reliance upon human-generated data can be reduced.

This Summary is provided to introduce a selection of technologies in a simplified form that are further described below in the Detailed Description. This Summary is intended to be used as an aid in determining the scope of the claimed subject matter. The term "technologies," for instance, can refer to system(s), method(s), computer-readable media/instructions, module(s), algorithms, hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), and/or technique(s) as permitted by the context described above and throughout the document.

BRIEF DESCRIPTION OF THE DRAWINGS

The detailed description is described with reference to the accompanying figures. The same reference numbers in different figures indicate similar or identical items.

DETAILED DESCRIPTION

This disclosure is directed to technologies and systems for neural network training. The techniques and systems described herein can be implemented in a number of ways. Examples are provided below with reference to the following figures. The examples and illustrations described herein can be combined.

Overview

The presently disclosed subject matter describes examples of technologies and systems for training networks to perform semantic segmentation. In various examples, the technologies and systems employ a training supervisor. According to various examples, a training supervisor can receive a training image, retrieve or generate a set of candidate segment masks for the training image, and rank the candidate segment masks based on various criteria, such as accuracy or relevancy. The training supervisor can select several of the ranked candidate segment masks and apply one of the selected, ranked candidate segment masks as the training mask for the neural network. The training supervisor can repeat the training process to further train the neural network.

Example Environment

Figure 1:
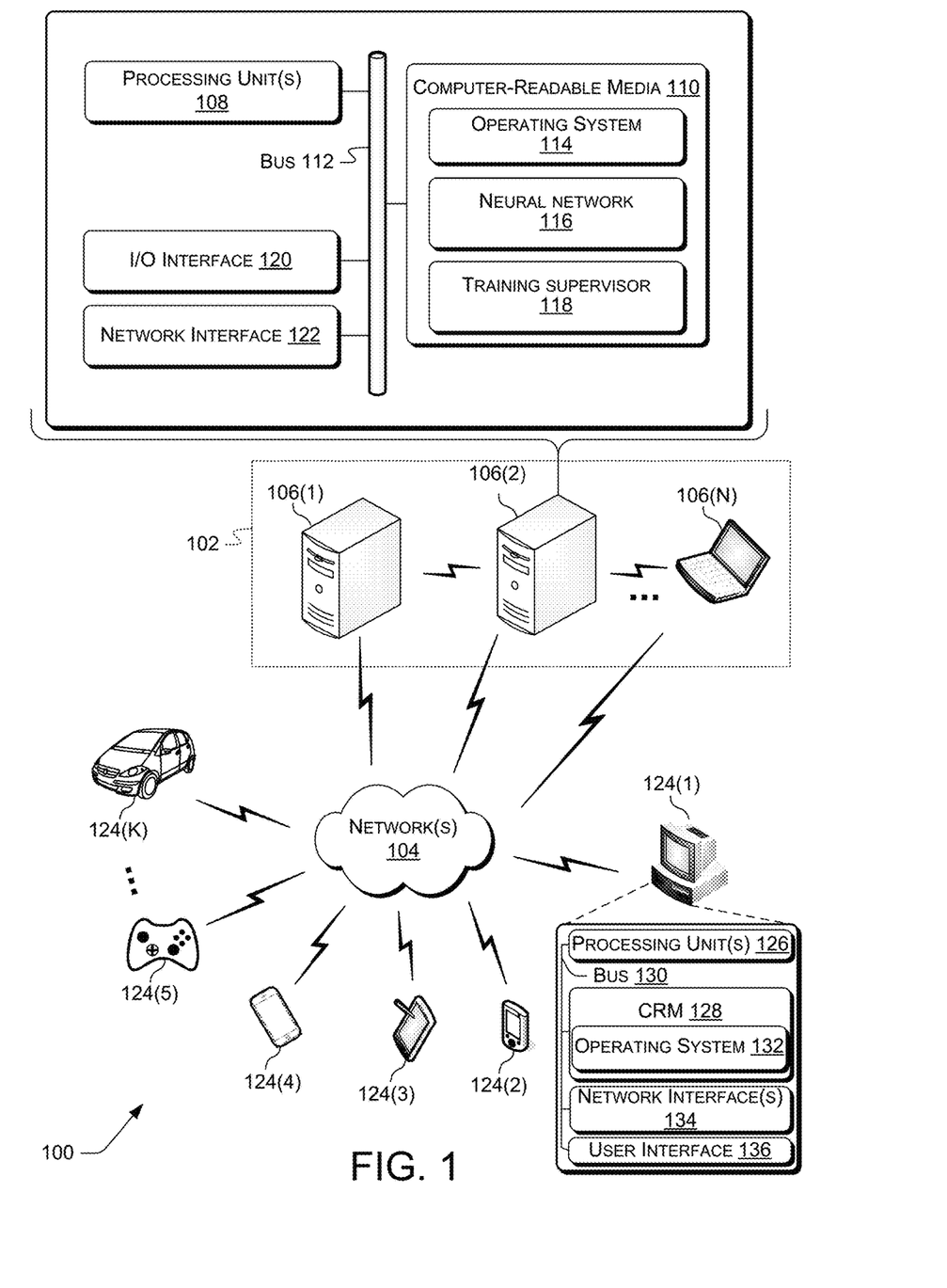
FIG. 1 is a block diagram depicting an example environment in which examples of neural network training can be implemented.

FIG. 1 shows an example environment 100 in which training networks for semantic segmentation can be implemented. The environment 100 described constitutes but one example and is not intended to limit the claims to any one particular operating environment. Other environments can be used without departing from the spirit and scope of the claimed subject matter. In some examples, the various devices and/or components of environment 100 include distributed computing resources 102 that can communicate with one another and with external devices via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Example embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(N). Embodiments support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile devices, special purpose-type devices, embedded-type devices, and/or wearable-type devices. Thus, although illustrated as desktop and laptop computers, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) 106 can include any type of computing device having one or more processing unit(s) 108 operably connected to computer-readable media (CRM) 110 such as via a bus 112, which in some instances can include one or more of a system bus, a data bus, an address bus, a PCI bus, a Mini-PCI bus, and any variety of local, peripheral, and/or independent buses.

CRM described herein, e.g., CRM 110, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and/or maintain information for access by a computing device 106 and/or consumer computing device 124.

In contrast to computer storage media, communication media can embody computer-readable instructions, data structures, program modules, or other data in a modulated data signal, such as a carrier wave, or other transmission mechanism. As defined herein, computer storage media does not include communication media.

Executable instructions stored on CRM 110 can include, for example, an operating system 114, a neural network 116, a training supervisor 118, and/or other modules, programs, or applications that are loadable and/or executable by processing units(s) 108. Additionally or alternatively, the functionally described herein can be performed, at least in part, by one or more hardware logic components such as accelerators. For example, and without limitation, illustrative types of hardware logic components that can be used include Field-Programmable Gate Arrays (FPGAs), Application-specific Integrated Circuits (ASICs), Application-Specific Standard Products (ASSPs), System-on-a-Chip systems (SOCs), Complex Programmable Logic Devices (CPLDs), etc. For example, an accelerator can represent a hybrid device, such as one from XILINX or ALTERA that includes a CPU course embedded in an FPGA fabric.

Device 106 can also include one or more input/output (I/O) interfaces 120 to allow device 100 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). For simplicity, other components are omitted from the illustrated device 106.

Device 106 can also include one or more network interfaces 122 to enable communications between computing device 106 and other networked devices such as consumer computing device(s) 124, also called a user device, through which a consumer or user can submit an input (e.g., a query, question, request for information, etc.). Such network interface(s) 122 can include one or more network interface controllers (NICs) or other types of transceiver devices to send and receive communications over a network. The consumer computing device 124 and/or device 106, in some examples, can be part of a distributed computing architecture.

Other devices involved in training neural networks to perform semantic segmentation can include consumer computing devices 124(1)-124(N). Consumer computing device (s) 124 can belong to a variety of categories or classes of devices such as traditional consumer-type devices, desktop computer-type devices, mobile devices, special purpose-type devices, embedded-type devices, and/or wearable-type devices. Thus, although illustrated as mobile computing devices, which can have less computing resources than device(s) 106, consumer computing device(s) 124 can include a diverse variety of device types and are not limited to any particular type of device. Consumer computing device(s) 124 can include, but are not limited to, server computers or blade servers such as Web servers, map/reduce servers or other computation engines, or network-attached-storage units (e.g., 124(1)), laptop computers, thin clients, terminals, or other mobile computers, personal data assistants (PDAs), wearable computers such as smart watches or biometric or medical sensors, implanted computing devices such as biometric or medical sensors, computer navigation consumer computing devices, satellite-based navigation system devices including global positioning system (GPS) devices and other satellite-based navigation system devices (e.g., 124(2), represented graphically as a PDA), tablet computers or tablet hybrid computers (e.g., 124(3)), smartphones, mobile phones, mobile phone-tablet hybrid devices, or other telecommunication devices (e.g., 124(4)), portable or console-based gaming devices or other entertainment devices such as network-enabled televisions, set-top boxes, media players, cameras, or personal video recorders (PVRs) (e.g., 124(5), represented graphically as a gamepad), automotive computers such as vehicle control systems, vehicle security systems, or electronic keys for vehicles (e.g., 124 (K), represented graphically as an automobile), desktop computers (e.g., 124(1)), or integrated components for inclusion in computing devices, appliances, or other computing devices configured to participate in or carry out neural network training as described herein. In some examples, a consumer computing device 124 can be categorized as a stationary device, a mobile device, or an embedded device. Examples of a stationary device include, but are not limited to, desktop computing devices, server computing devices, a dedicated gaming console, and the like. Examples of mobile devices include, but are not limited to, a laptop computer, a notebook computer, an ultra-portable computer, a netbook computer, or a computing device such as a "smart" mobile telephone, a tablet device, a slate device, a portable video game device, or the like. Examples of embedded devices include, but are not limited to, internet-enabled televisions, automobiles, appliances, and the like. It should be appreciated that technologies described herein are not limited to requiring a consumer computing device 124 to be in communication with a device 106 via the network 104, as aspects described herein can be implemented fully or partially on the consumer computing device 124 without the device 106.

Consumer computing device(s) 124 can represent any type of computing device having one or more processing unit(s) 126 operably connected to computer-readable media (CRM) 128 such as via a bus 130, which in some instances can include one or more of a system bus, a data bus, an address bus, a PCI bus, a Mini-PCI bus, and any variety of local, peripheral, and/or independent buses.

Executable instructions stored on CRM 128 can include an operating system 132 and other modules, programs, or applications that are loadable and executable by processing units(s) 126. Additionally or alternatively, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Consumer computing device 124 can also include one or more I/O interfaces including one or more network interfaces 134 and user interfaces 136 to enable communications between consumer computing device 124 and other networked devices such as other consumer computing device(s) 124 or devices 106 over network(s) 104. Such network interface(s) 134 can include one or more network interface controllers (NICs) or other types of transceiver devices to send and receive communications over a network.

Consumer computing device 124 can also include a user interface 136 to enable the device 124 to receive user input and a response to the input. Examples support the user interface 136 receiving input from the user, such as, for example, a query. Additionally or alternatively, the user interface 136 can provide a display of the annotated images, examples of annotated text, and other outputs not explicitly disclosed herein.

Figure 2:
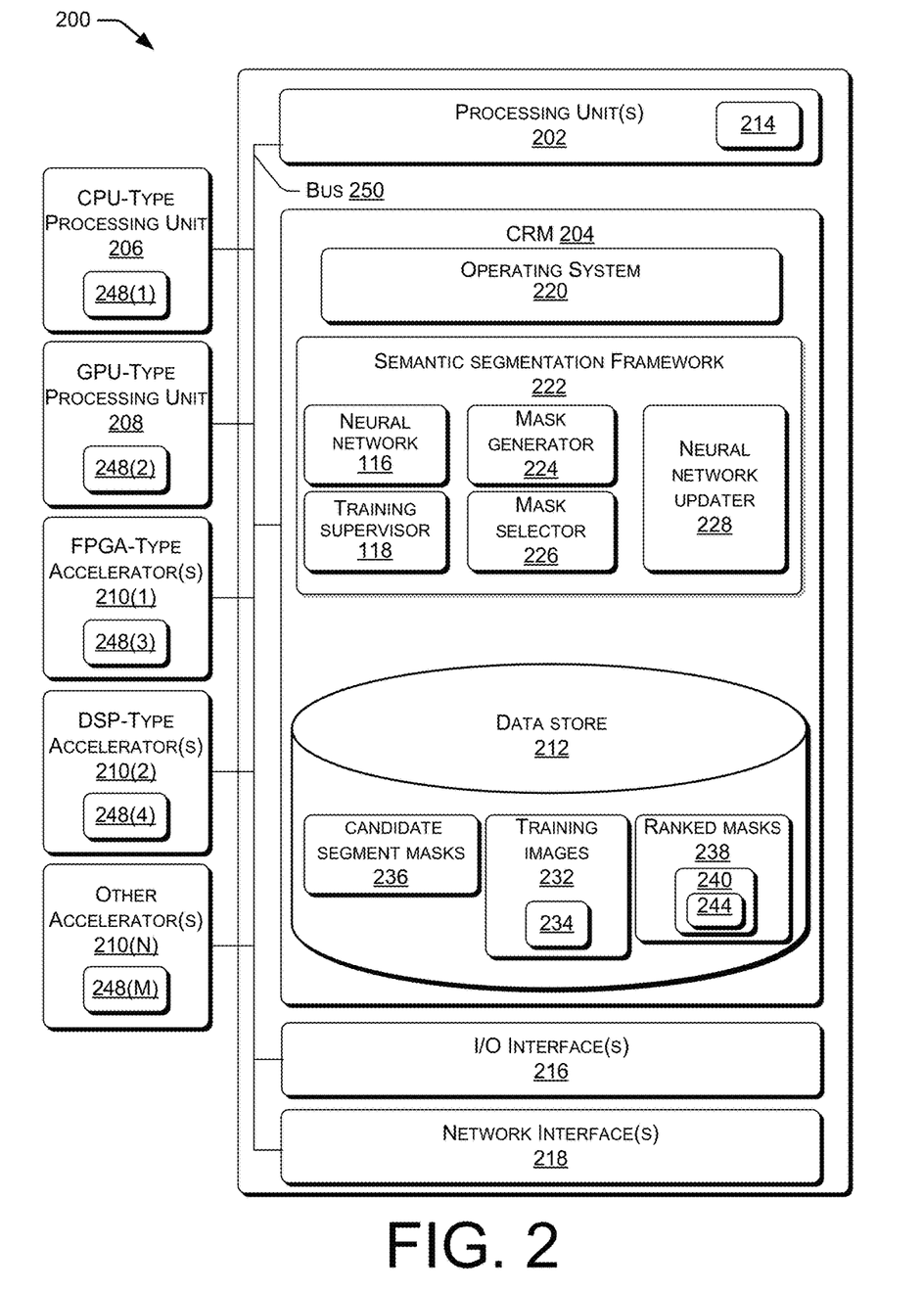
FIG. 2 is a block diagram depicting an example computing device configured to participate in neural network training.

FIG. 2 is a block diagram depicting an example computing device 200 configured to participate in a system for training a neural network. In some examples, computing device 200 may be one computing device of a distributed computing resource, such as a device 106 from FIG. 1. In device(s) 200, processing unit(s) 202, can include processing unit(s) 108 and can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, CRM 204 can represent CRM 110 and can store instructions executable by the processing unit(s) 202, which as discussed above, can represent a processing unit incorporated in device 200. CRM 204 can also store instructions executable by external processing units such as by an external CPU-type processing unit 206, an external GPU-type processing unit 208, and/or executable by an external accelerator 210, such as an FPGA-type accelerator 210(1), a DSP-type accelerator 210(2), or any other accelerator 210(N). In various examples at least one CPU-type processing unit, GPU-type processing unit, and/or accelerator is incorporated in device 200, while in some examples one or more of a CPU-type processing unit, GPU-type processing unit, and/or accelerator is external to device 200.

In the illustrated example, CRM 204 also includes a data store 212. The data store 212 can be a repository for the persistent storage of various types of files or data. In some examples, data store 212 includes data storage such as a database, data warehouse, or other type of structured or unstructured data storage. In some examples, data store 212 includes a corpus and/or a relational database with one or more tables, indices, stored procedures, and so forth to enable data access such as web tables including one or more of hypertext markup language (HTML) tables, resource description framework (RDF) tables, web ontology language (OWL) tables, and/or extensible markup language (XML) tables, for example. Data store 212 can store data and/or instructions for the operations of processes, applications, components, and/or modules stored in CRM 204 and/or executed by processing unit(s) 202. Data store 212 can act as a repository for other data, explained in more detail below.

Alternately, some or all of the above-referenced data and/or instructions can be stored on separate memories 214 on board one or more processing unit(s) 202 such as a memory on board a CPU-type processor, a GPU-type processor, an FPGA-type accelerator, a DSP-type accelerator, and/or another accelerator.

Device(s) 200 can further include one or more input/output (I/O) interfaces 216, which can be I/O interface 120, to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 200, network interface(s) 218, which can be network interface(s) 122, can represent, for example, network interface controllers (NICs) or other types of transceiver devices to send and/or receive communications over a network.

In the illustrated example, CRM 204 also includes an operating system 220, which can include operating system 114. CRM 204 also includes a semantic segmentation framework 222. Semantic segmentation framework 222 can include one or more modules and/or APIs, which are illustrated as blocks 116, 118, 224, 226, and 228 although this is just an example, and the number can vary higher or lower. Functionality described associated with blocks 116, 118, 224, 226, and/or 228 can be combined to be performed by a fewer number of modules and/or APIs or it can be split and performed by a larger number of modules and/or APIs. Moreover, data store 212 can include one or more types of data, which are illustrated as blocks 230, 232, 234, 236, 238, and 240, although this is just an example, and the number can vary higher or lower. Data described associated with blocks 230, 232, 234, 236, 238, and/or 240 can be combined to be stored in a fewer number of files or partitions or it can be split and stored in a larger number of files or partitions.

The semantic segmentation framework 222 can include the neural network 116. The neural network 116 can be models used to estimate or approximate functions that can depend on a relatively large number of inputs, some of all of which may be unknown. In some examples, the neural network 116 can be a convolutional neural network 116 that can be a type of feed-forward neural network in which connections between the various units of the neural network do not form a directed cycle, unlike recurrent neural networks. The neural network 116 can be used by one or more outside systems to perform various tasks. In some examples, the neural network 116 can be used to identify different objects in an image and apply a label to the identified objects. The accuracy of the neural network 116 in performing various tasks can be increased by training the neural network 116.

To train the neural network 116, the semantic segmentation framework 222 can invoke the training supervisor 118. In examples, the training supervisor 118 coordinates and/or organizes the various training operations on the neural network 116. The training supervisor 118 can have access to training images 230 that can be used to train the training supervisor 118. The training images 230 can be random images, images with or without color, or relatively complex or relatively simple. In examples, the semantic segmentation framework is not limited to any particular type, size, or style of image. In examples, the training images 230 are labeled with ground-truth bounding boxes of objects (e.g. "person," "car," "boat"). A ground-truth bounding box may be provided by a human or other system considered to have a relatively high degree of accuracy in labeling images.

In a training process, a training image 232 can be received by the training supervisor 118 from the training images 230. A mask generator 224 generates several candidate segment masks 234 for the training image 232. The candidate segment masks 234 may be generated using various methods. In some examples, the candidate segment masks 234 can be generated using a region proposal method such as a multi-scale combinatorial grouping method, though the semantic segmentation framework is not limited to any particular method for generating the candidate segment masks 234. In examples, the candidate segment masks 234 are fixed throughout the training procedure. In other words, once the candidate segment masks 234 are generated, the candidate segment masks 234 will not be modified, added to with some masks, or masks removed from the candidate segment masks 234. It should be understood, however, that in other examples, the candidate segment masks 234 may be modifiable during various phases of the training procedure. The mask generator 224 ranks the candidate segment masks 234 to generate a set of ranked candidate segment masks 236. A mask selector 226 selects a set 238 of the ranked candidate segment masks 236. The neural network updater 228 can select one of the set 238 as the training mask to train the neural network 116.

During training, objects in the candidate segment masks 234 can be assigned a label that can be, by way of example, and not by limitation, a semantic category or background. A semantic category can be a grouping of vocabulary within a language, organizing words which are interrelated and define each other in various ways. A semantic category can also be referred to as a semantic field. The labels assigned to one or more of the candidate segment masks 234 can be updated as the training process continues.

The training image 232 having the ground-truth bounding box annotation can be used to select one or more candidate segment masks 234 that overlap the box to a desired degree.

Formally, an overlapping objective function $\epsilon_o$ can be defined as Equation (1):

$$\varepsilon_o = \frac{1}{N} \sum_a (1 - IoU(B, S))\delta(l_B, l_S) \qquad (1)$$

where S represents a candidate segment mask, and B represents a ground-truth bounding box annotation. IoU(B,S)∈ [0, 1] can be the intersection-over-union ratio computed from the ground-truth box B and the tight bounding box of the segment S. The function δ can be equal to one if the semantic label $l_S$ assigned to segment S is the same as the ground-truth label $l_B$ of the bounding box B, and zero otherwise. Minimizing $\epsilon_o$ favors higher IoU scores when the semantic labels are consistent. This objective function can be normalized by the number of candidate segments N.

With the candidate segment masks and their estimated semantic labels, a deep convolutional network can be supervised in a manner denoted by Equation (2):

$$\varepsilon(\theta) = \sum_p e(X_\theta(p), l(p)), \qquad (2)$$

where p is a pixel index, l(p) is the ground-truth semantic label at a pixel, and $X_\theta(p)$ is the per-pixel labeling produced by the fully convolutional network with parameters θ. $e(X_\theta(p), l(p))$ is the per-pixel loss function. The network parameters θ can be updated by back-propagation and stochastic gradient descent (SGD).

The following regression objection function $\epsilon_r$ can be used in the process to generate candidate segments, identified as Equation (3):

$$\varepsilon_r = \sum_p e(X_\theta(p), l_S(p)) \quad (3)$$

where $l_S$ is the estimated semantic label used as supervision for the network training. This objective function is the same as Equation (2) except that its regression target can be the estimated candidate segment.

An objective function can be minimized that combines the above equations, identified as Equation (4):

$$\min_{\theta,\{l_S\}} \sum_i (\varepsilon_o + \lambda \varepsilon_r) \quad (4)$$

where the summation $\Sigma_i i$ runs over the training images, and $\lambda=3$ is a fixed weighting parameter. The variables that can be optimized are the network parameters $\theta$ and the labeling $\{l_S\}$ of all candidate segments $\{S\}$. If the term $\epsilon_o$ exists and the term $\epsilon_r$ is zero, the optimization problem in Equation (4) finds a candidate segment that has the largest IoU score with the box; if the term $\epsilon_r$ exists and the term $\epsilon_o$ is zero, the optimization problem in Equation (4) can be equivalent to a fully convolutional network method. The technology described herein can consider both the optimization function and the fully convolutional network function.

The objective function in Equation (4) involves a problem of assigning labels to the candidate segments. A greedy iterative solution can be used to find a local optimum. With the network parameters $\theta$ fixed, the semantic labeling $\{l_S\}$ can be updated for all candidate segments. The case in which one ground-truth bounding box can "activate" (i.e., assign a non-background label to) one or more candidates can be considered for implementation. If this implementation can be used, the semantic labeling can be updated during the training process by selecting a single candidate segment for each ground-truth bounding box, such that its cost is the smallest among all candidates. The selected segment can be assigned the ground-truth semantic label associated with that bounding box. A plurality of the other pixels can be assigned to the background label.

In some examples, the above approach can use the same candidate segments (or similar segments) due to the relatively low cost of those candidate segments. If the same candidate segments are selected, the training process may be "trapped" in a relatively poor, local optima, resulting in a relatively poor training process.

To reduce the probability of approaching and/or staying in a local optima, a random sampling method to select candidate segments for each ground-truth bounding box can be used. In the random method, instead of selecting the single segment with the largest cost $\epsilon_o + \lambda \epsilon_r$, segment can be randomly sampled from a first set of segments with the largest cost. For example, of a set of 5 candidate segments can be sampled from an initial set of candidate segments. With the semantic labeling $\{l_S\}$ of all candidate segments fixed, the network parameters can be updated.

In this example, the problem becomes the fully convolutional network problem as in Equation (2). This problem can be minimized using various methods, such as stochastic gradient descent. In examples, the above two steps of candidate segment identification and random selection are iteratively performed, fixing one set of variables and solving for the other set. For one or more of the iterations, the network parameters $\theta$ can be updated using one training epoch (i.e., all training images are visited once). Thereafter, the segment labeling of all images can be updated.

It is to be noted that some or all of the above-referenced data described above can be stored on separate memories 242, such as memory 242(1) on board a CPU-type processing unit 206, memory 242(2) on board a GPU-type processing unit 208, memory 242(3) on board an FPGA-type accelerator 210(1), memory 242 (4) on board a DSP-type accelerator 210(2), and/or memory 242(M) on board another accelerator 210(N).

Bus 244, which can be bus 112, and which in some instances can include one or more of a system bus, a data bus, an address bus, a PCI bus, a Mini-PCI bus, and any variety of local, peripheral, and/or independent buses, can operably connect CRM 204 to processing unit(s) 202.

Example of Neural Network Training Using a Training Supervisor

Figure 3:
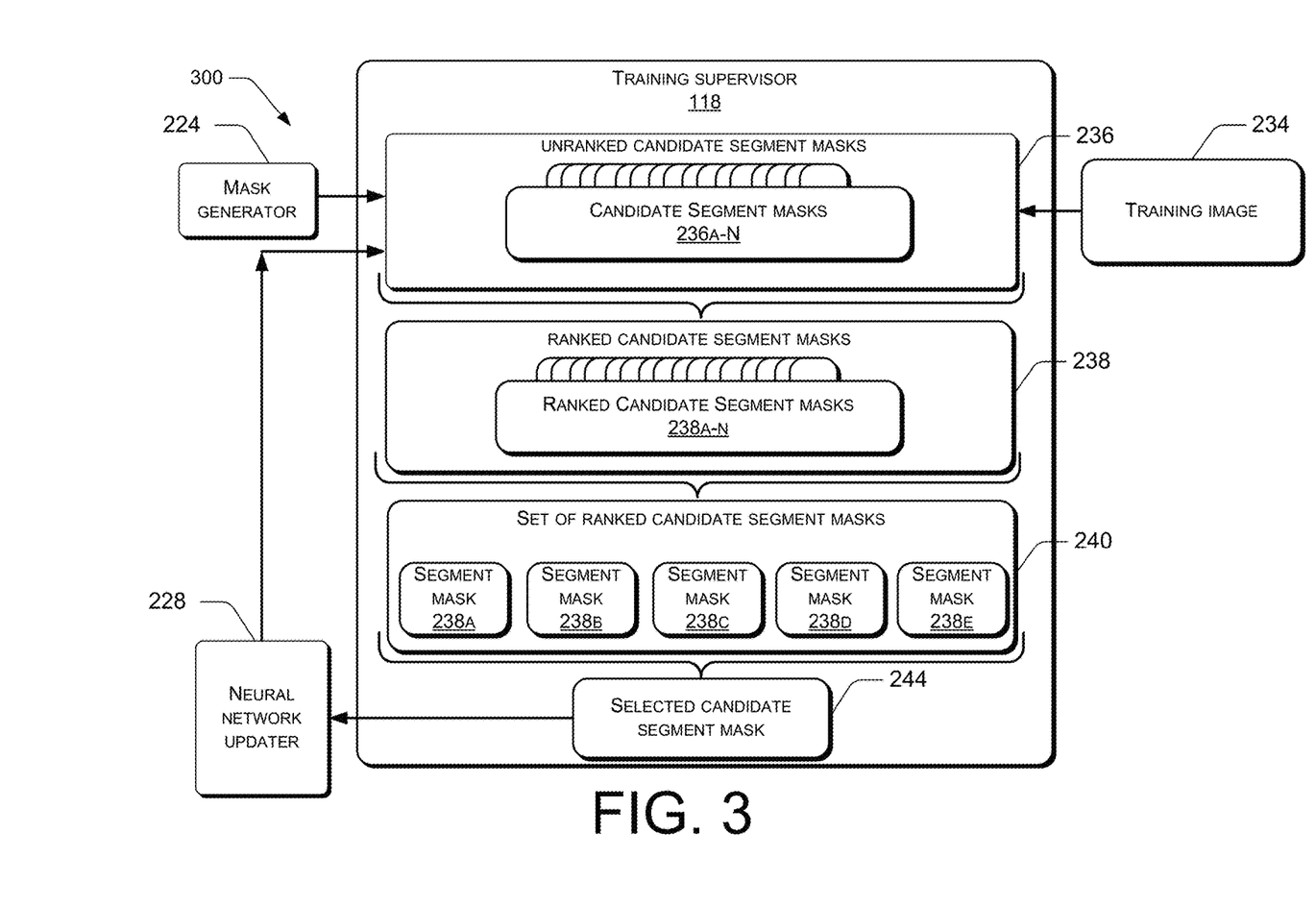
FIG. 3 is a diagram of a training system for training a neural network.

FIG. 3 is a diagram of a training system 300 for training a neural network, such as the neural network 116 of FIG. 2. The training system 300 uses the training supervisor 118. In examples, the training supervisor 118 controls one or more aspects of a training process. The training supervisor 118 can act as a director to retrieve, sort, rank, coordinate and/or perform other operations on data. The training supervisor 118 can train the neural network 116 in a manner described above in relation to FIG. 2 or other methods not explicitly disclosed herein.

To perform a training operation, the training supervisor 118 invokes a training process whereby a training image 232 can be received from a set of training images 230. The training images 230 can be random images, images with or without color, or relatively complex or relatively simple. In examples, the semantic segmentation framework is not limited to any particular type, size, or style of image. In examples, the training image 232 can be labeled with one or more ground-truth bounding boxes of objects (e.g. "person," "car," "boat"). A ground-truth bounding box may be provided by a human or other system considered to have a relatively high degree of accuracy in labeling images.

The training supervisor 118 invokes the mask generator 224 to generate candidate segments masks 234A-N. The candidate segment masks 234A-N can be generated using various technologies. For example, the candidate segment masks 234A-N can be generated based on a criteria of relevance to the training image 232.

The training supervisor 118 ranks the candidate segment masks 234A-N to generate the ranked candidate segment masks 236A-N. The ranked candidate segment masks 236A-N can be ranked using various technologies. For example, the ranked candidate segment masks 236A-N can be ranked according to a measure of how close the masks resemble the ground-truth bounding boxes in the training image 232.

From the ranked candidate segment masks 236, the training supervisor 118 selects a set 238 of the ranked candidate segment masks 236, illustrated in FIG. 3 as ranked candidate segment masks 236 A, 236 B, 236 C, 236 D, and 236 E. The set 238 can be generated using various technologies. For example, the set 238 can be generated by random selection of the ranked candidate segment masks 236A-N. In examples, the random selection can help reduce the probability of the poor, local optima situation described above. One of the ranked candidate masks 236A-E can be selected and used to train the neural network 116. The neural network updater 228 receives the selected candidate segment mask 240 to train the neural network 116. The selected candidate segment mask 240 can be used as an input to the training supervisor 118 to rank the candidate segment masks 234A-N, allowing repetition of the process.

Figure 4:
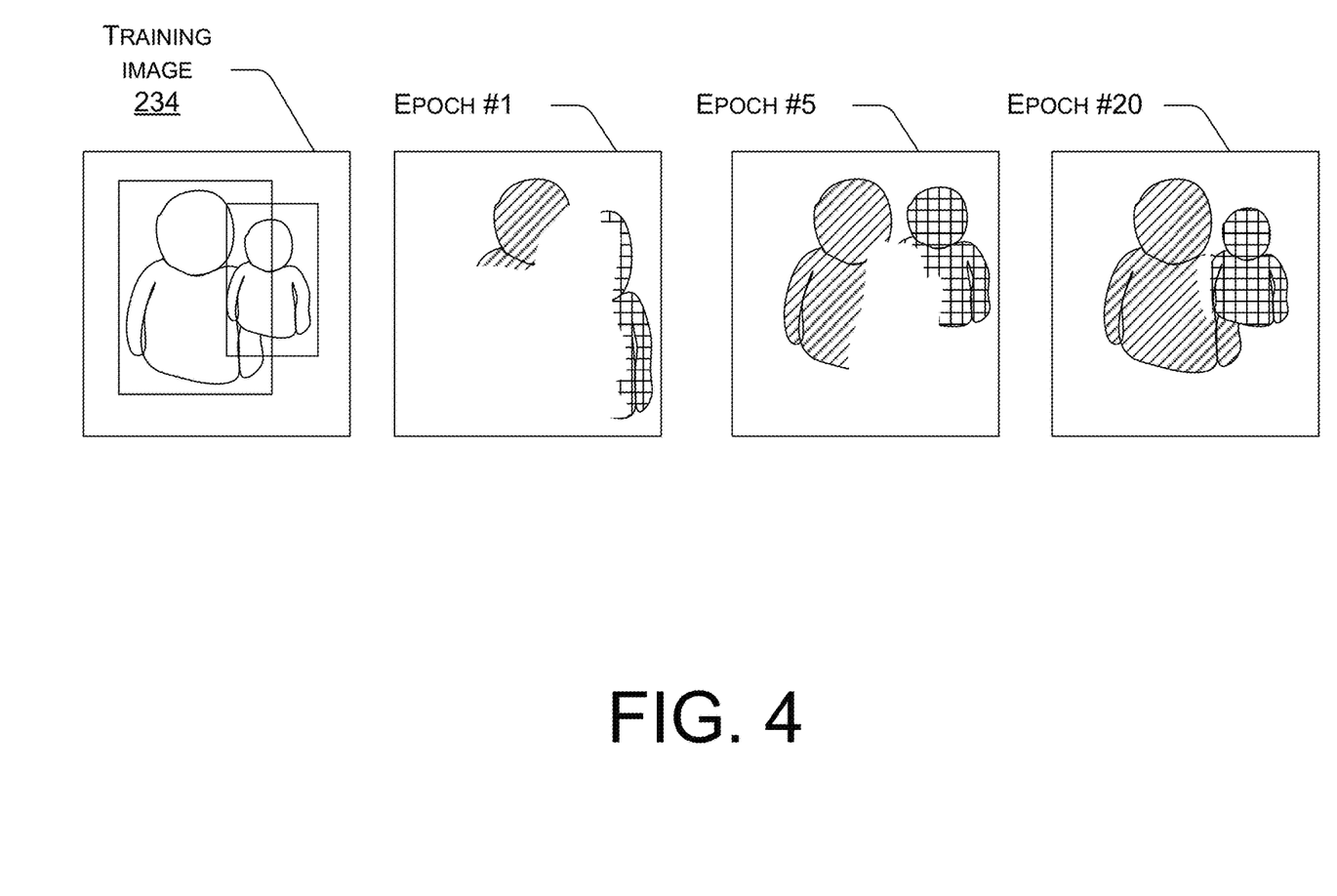
FIG. 4 is an illustration showing an evolution of training a neural network.

FIG. 4 is an illustration showing the evolution of training the neural network 116. In FIG. 4, the training image 232 can be received by the training supervisor 118. As described by way of example above, the training supervisor 118 invokes the mask generator 224 to generate the candidate segment masks 234. After the candidate segment masks 234 are ranked and one of the ranked candidate segment masks 234 can be chosen as the selected candidate segment mask 240, the selected candidate segment mask 240 can be used to train the neural network 116.

Several of the epochs (or training evolutions) are illustrated by way of example in FIG. 4. In FIG. 4, in epoch #1, it can be seen that the selected candidate segment mask 240 does not segment the two objects in the candidate training image 232 particularly well. The selected candidate segment mask 240 used for epoch #1 can be used as the input to supervise the training of the following epoch, epoch #2 (not illustrated). The process can be repeated for a desired number of evolutions.

In FIG. 4, epoch #5 is shown to have a relatively better segmentation than epoch #1, as the left and right objects are segmented to a greater degree in a manner similar to the training image 232 than the image illustrated in epoch #1. The process can be further repeated, whereby the candidate segment mask can be used to supervise the next training evolution. In the process illustrated in FIG. 4, epoch #20 shows almost complete segmentation between the two objects. Continued training evolutions may result in increasing segmentation accuracy.

Example Processes

Figure 5:
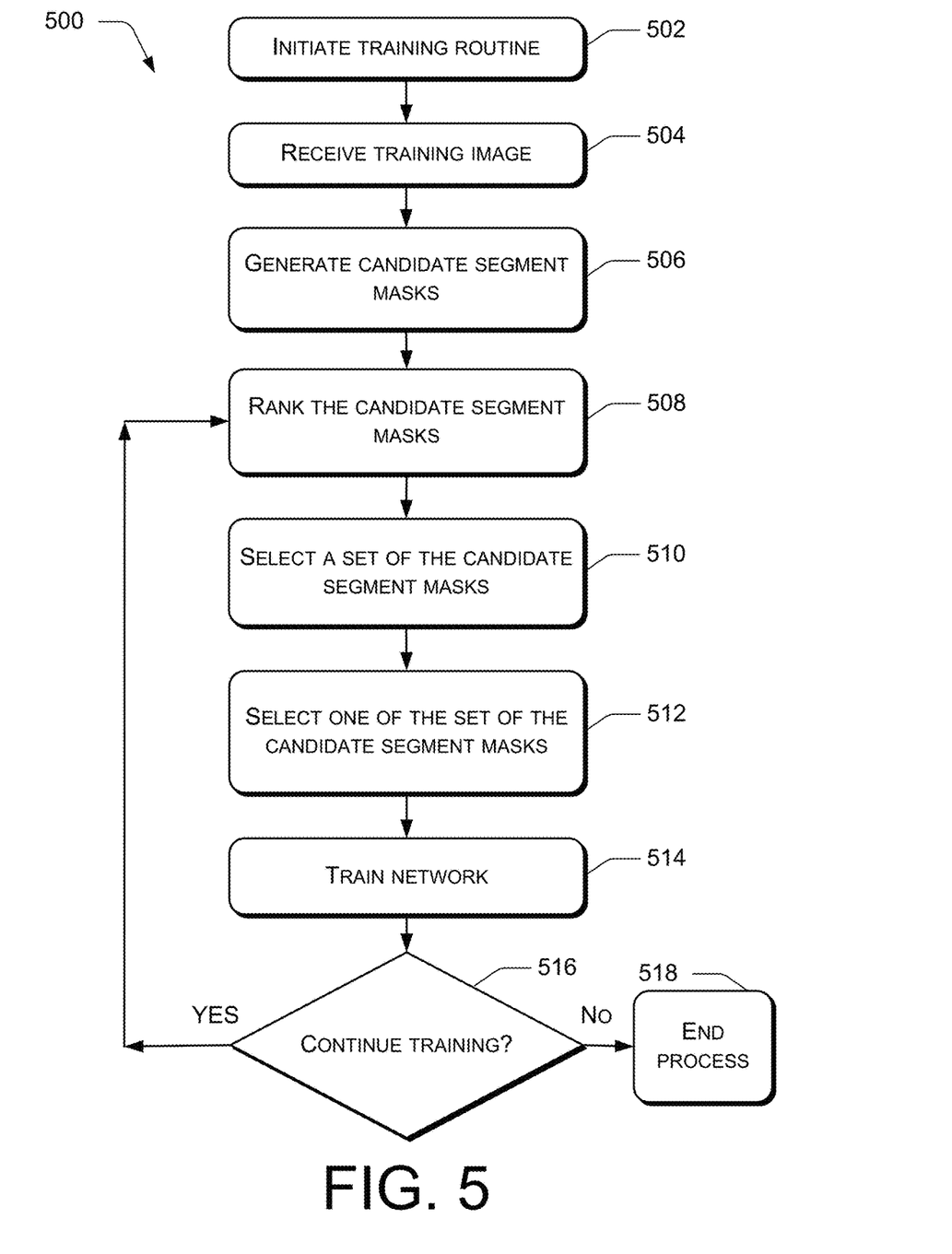
FIG. 5 is a flow diagram depicting an example neural network training routine.

FIG. 5 is a flow diagram depicting aspects of neural network training. The operations of the routines disclosed herein are not necessarily presented in any particular order and that performance of some or all of the operations in an alternative order(s) is possible and is contemplated. The operations have been presented in the demonstrated order for ease of description and illustration. Operations can be added, omitted, and/or performed simultaneously, without departing from the scope of the appended claims.

Some or all operations of the routines, and/or substantially equivalent operations, can be performed by execution of computer-executable instructions included on computer-readable media, as defined herein. The term "computer-executable instructions," and variants thereof, as used in the description and claims, is used expansively herein to include routines, applications, application modules, program modules, programs, components, data structures, algorithms, and the like.

Thus, it should be appreciated that the logical operations described herein are implemented (1) as a sequence of computer implemented acts or program modules running on a computing system and/or (2) as interconnected machine logic circuits or circuit modules within the computing system. The example is a matter of choice dependent on the performance and other requirements of the computing system. Accordingly, the logical operations described herein are referred to variously as states, operations, structural devices, acts, or modules. These operations, structural devices, acts, and modules can be implemented in software, in firmware, in special purpose digital logic, and any combination thereof. The operations of the routines are described herein below as being implemented, at least in part, by the training supervisor 118 on the neural network 116. One or more of the operations of the routines described herein, and the other operations described herein, can alternatively or additionally be implemented, at least in part, by other similarly configured components in a consumer device 124, the distributed computing resources 102 including one or more devices 106, and/or one or more devices 200, even if not specifically designated in the figures.

FIG. 5 depicts an example neural network training routine 500. At block 502, the training supervisor 118 commences a training operation. In examples, the training supervisor 118 can be one or modules of a program that control the training process. It should be understood that the presently disclosed subject matter does not require a separate training supervisor 118, as the operations described in conjunction with the training supervisor 118 may be distributed among various modules. The presently disclosed subject matter is not limited to any particular manner of operation for the training supervisor 118, or other modules described herein.

At block 504, the training supervisor 118 receives a training image. The training image can be a ground-truth bounding box image containing objects. The bounding boxes can be generated using human teachers. In some examples, large datasets of ground-truth bounding boxes can be relatively expensive, as the cost of labor can be significant. By contrast, data sets that contain only machine generated bounding boxes can be relatively inexpensive. However, the bounding box accuracy in these images can be only as good as the programmed machine that generated them, and in some cases, can be relatively inaccurate.

Therefore, in examples, an image with ground-truth bounding boxes can be used as the initial input to generate candidate segment masks, while a selected candidate segment mask can be used to train the neural network, both in the initial training evolution and subsequent training evolutions. In this manner, the accuracy of ground-truth bounding boxes can be used in conjunction with a relatively low-cost automated approach.

At block 506, the mask generator 224 generates candidate segment masks based on the received training image. The candidate segment masks may be several segment masks that are generated that approximate the segmentation of the objects in the received training image. As noted above, the received training image can be segmented using ground-truth bounding boxes. In semantic segmentation, the objects in an image are segmented not at the bounding box level, but rather, at the pixel level. The image can be segmented into regions comprising the various objects defined by the class labels. The candidate segment masks represent various estimations of semantic segmentation using the ground-truth bounding box as the input for the first evolution of training.

At box 508, the training supervisor 118 ranks the candidate segment masks. In some examples, Equation (1) may be used to rank the candidate segment masks in relation to their relative closeness to the ground-truth bounding box. The ranking of the candidate segment masks may be performed using other criteria or in conjunction with one or more criteria. The presently disclosed subject matter is not limited to any particular technology for ranking the candidate segment masks.

At block 510, the training supervisor 118 selects a set of the ranked candidate segment masks. The number of the set of the ranked candidate segment masks can vary. In examples, the top five ranked candidate segment masks may be selected as the set of the ranked candidate segment masks. In examples, selecting a set rather than using the whole can provide various benefits. For example, selecting a set can reduce processing requirements and/or memory usage. In another example, selecting a set can increase the randomness of the candidate segment mask selection process, thus possibly increasing the efficiency of the training process and/or avoiding the likelihood of entering the condition of a poor, local optima resulting in a relatively poor training process.

At block 512, the training supervisor 118 selects one of the set of the ranked candidate segment masks. The selection process can vary. In examples, the selection can be a random selection of one of the set. In other examples, the selection can be a particular ranking of the set of the ranked candidate segment masks. The presently disclosed subject matter is not limited to any particular technology for the selection.

At block 514, the training supervisor 118 trains the neural network by using the selected one of the set of the ranked candidate segment masks. The presently disclosed subject matter is not limited to any particular technology for training the neural network using the selected one of the set of the ranked candidate segment masks.

At block 516, a decision can be made as to whether or not further training is to continue. If no further training is to continue, at block 518, the process ends. If further training is to continue, the routine 500 continues to block 508, where the candidate segment masks are ranked. As noted above, in examples, the initially created candidate segment masks are used throughout the training evolution for one of the training images. In some examples, candidate segment masks may be generated upon each instance of training. The subsequent training processes may continue in the manner described above.

Example Clauses

A: A device, comprising a processor; and a computer-readable medium in communication with the processor, the computer-readable medium including one or more modules comprising: a training supervisor module configured to initiate and control a neural network training process, the training supervisor module configured to receive a training image; a mask generator module configured to: generate candidate segment masks based on the training image received by the training supervisor module; and rank the candidate segment masks to generate ranked candidate segment masks; a mask selector module configured to select a set of the ranked candidate segment masks to generate a set of ranked candidate segment masks; and a neural network updater module configured to: select one of the set of ranked candidate segment masks to train the neural network; and train the neural network.

B: A device as paragraph A describes, where the training image comprises a ground-truth bounding box.

C: A device as either paragraph A or B describe, where the candidate segment masks overlap the ground-truth bounding box at least in part as a degree of overlap.

D: A device as any of paragraphs A-C describe, where the ranked candidate segment masks are ranked based at least in part on the degree of overlap with the ground-truth bounding box.

E: A device as any of paragraphs A-D describe, where the set of the ranked candidate segment masks comprises a subset of the ranked candidate segment masks.

F: A device as any of paragraphs A-E describe, where the one of the set of ranked candidate segment masks to train the neural network is selected randomly from the set of ranked candidate segment masks.

G: A device as any of paragraphs A-F describe, where the neural network updater is further configured to use the one of the set of ranked candidate segment masks to train the neural network in a subsequent training evolution.

H: A device as any of paragraphs A-G describe, where the candidate segment masks are used in an initial and subsequent training evolutions.

I: A method, comprising receiving an input image; generating candidate segment masks based on the input image; and performing an initial training operation comprising: ranking the candidate segment masks to generate ranked candidate segment masks; selecting a set of the ranked candidate segment masks to generate a set of the ranked candidate segment masks; selecting one mask of the set of the ranked candidate segment masks; and training a neural network by applying the selected mask of the set of the ranked candidate segment masks to the network.

J: A method as paragraph I describes, wherein the training image comprises a ground-truth bounding box.

K: A method as either paragraph I or J describes, where the candidate segment masks overlap the ground-truth bounding box at least in part as a degree of overlap.

L: A method as any of paragraphs I-K describe, where the ranked candidate segment masks are ranked based at least in part on the degree of overlap with the ground-truth bounding box.

M: A method as any of paragraphs I-L describe, wherein the one mask of the set of the ranked candidate segment masks is selected randomly.

N: A method as any of paragraphs I-M describe, further comprising performing a subsequent training operation comprising: receiving the selected one mask of the set of the ranked candidate segment masks to generate second ranked candidate segment masks, selecting a set of the second ranked candidate segment masks to generate a set of the second ranked candidate segment masks, selecting one mask of the set of the second ranked candidate segment masks, and training the neural network by applying the selected mask of the set of the second ranked candidate segment masks to the network.

O: A method as any of paragraphs I-N describe, further comprising performing a subsequent training operation comprising: receiving the selected one mask of the set of the ranked candidate segment masks to generate second candidate segment masks; ranking the second candidate segment masks to generate second ranked candidate segment masks; selecting a set of the second ranked candidate segment masks to generate a set of the second ranked candidate segment masks; selecting one mask of the set of the second ranked candidate segment masks; and training the neural network by applying the selected mask of the set of the second ranked candidate segment masks to the network.

P: A method as any of paragraphs I-O describe, wherein an object in at least one of the candidate segment masks is assigned a label representing at least one of a semantic category or background.

Q: A method as any of paragraphs I-P describe, further comprising updating the label during training.

R: A computer-readable medium having thereon computer-executable instructions that responsive to execution configure a computer to perform a method as any of paragraphs I-Q describes.

S: A device or system comprising: a processor; and a computer-readable medium coupled to the processor, the computer-readable medium including instructions to configure one or more devices to perform a method as any of paragraphs I-Q describes.

T: A device or system comprising: means for processing; and means for storing coupled to the means for processing, the means for storing, storing instructions to configure one or more devices to perform a method as any of paragraphs I-Q describes.

U: A computer-readable medium having computer-executable instructions thereupon that, when executed by a computer, cause the computer to: receive an input image comprising a ground-truth bounding box; generate candidate segment masks based on the input image; and perform an training operation comprising ranking the candidate segment masks to generate ranked candidate segment masks, selecting a set of the ranked candidate segment masks to generate a set of the ranked candidate segment masks, randomly selecting one mask of the set of the ranked candidate segment masks, and training a neural network by applying the selected mask of the set of the ranked candidate segment masks to the network.

V: A computer-readable medium as paragraph U describes, further comprising computer-executable instructions thereupon that, when executed by the computer, cause the computer to: assign a label to an object in at least one of the candidate segment masks; and update the label during the training operation.

W: A computer-readable medium as either paragraph U or V describes, further comprising computer-executable instructions thereupon that, when executed by the computer, cause the computer to: receive the selected one mask of the set of the ranked candidate segment masks to generate second ranked candidate segment masks, select a set of the second ranked candidate segment masks to generate a set of the second ranked candidate segment masks, select one mask of the set of the second ranked candidate segment masks, and train the neural network by applying the selected mask of the set of the second ranked candidate segment masks to the network.

Conclusion

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

All of the methods and processes described above can be embodied in, and fully automated via, software code modules executed by one or more general purpose computers or processors. The code modules can be stored in any type of computer-readable storage medium or other computer storage device. Some or all of the methods can alternatively be embodied in specialized computer hardware.

Conditional language such as, among others, "can," "could," "may" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A device comprising:
    a processor; and
    a computer-readable medium storing instructions that, when executed by the processor, cause the processor to perform acts comprising:
        receiving a training image;
        generating candidate segment masks based at least in part on the training image;
        ranking the candidate segment masks to generate ranked candidate segment masks;
        selecting a set of the ranked candidate segment masks to generate a set of ranked candidate segment masks;
        selecting one of the set of ranked candidate segment masks to train the neural network; and
        training the neural network.

2. A device as claim 1 recites, wherein the training image comprises a ground-truth bounding box.

3. A device as claim 1 recites, wherein the candidate segment masks overlap the ground-truth bounding box at least in part as a degree of overlap.

4. A device as claim 3 recites, wherein the ranked candidate segment masks are ranked based at least in part on the degree of overlap with the ground-truth bounding box.

5. A device as claim 1 recites, wherein the set of the ranked candidate segment masks comprises a subset of the ranked candidate segment masks.

6. A device as claim 1 recites, wherein the one of the set of ranked candidate segment masks to train the neural network is selected randomly from the set of ranked candidate segment masks.

7. A device as claim 1 recites, the acts further comprising using the one of the set of ranked candidate segment masks to train the neural network in a subsequent training evolution.

8. A device as claim 1 recites, wherein the candidate segment masks are used in an initial and subsequent training evolutions.

9. A method, comprising:
    receiving an input image;
    generating candidate segment masks based at least in part on the input image; and
    performing an initial training operation comprising:
        ranking the candidate segment masks to generate ranked candidate segment masks;
        selecting a set of the ranked candidate segment masks to generate a set of the ranked candidate segment masks;
        selecting a mask of the set of the ranked candidate segment masks as a selected mask; and training a neural network by applying the selected-mask of the set of the ranked candidate segment masks to the neural network.

10. A method as claim 9 recites, wherein the training image comprises a ground-truth bounding box.

11. A method as claim 9 recites, wherein the candidate segment masks overlap the ground-truth bounding box at least in part as a degree of overlap.

12. A method as claim 11 recites, wherein the ranked candidate segment masks are ranked based at least in part on the degree of overlap with the ground-truth bounding box.

13. A method as claim 9 recites, wherein the mask of the set of the ranked candidate segment masks is selected randomly.

14. A method as claim 9 recites, further comprising performing a subsequent training operation comprising:
receiving the selected mask of the set of the ranked candidate segment masks to generate second ranked candidate segment masks,
selecting a set of the second ranked candidate segment masks to generate a set of the second ranked candidate segment masks,
selecting a second mask of the set of the second ranked candidate segment masks, and
training the neural network by applying the second mask of the set of the second ranked candidate segment masks to the neural network.

15. A method as claim 9 recites, further comprising performing a subsequent training operation comprising:
receiving the selected mask of the set of the ranked candidate segment masks to generate second candidate segment masks;
ranking the second candidate segment masks to generate second ranked candidate segment masks;
selecting a set of the second ranked candidate segment masks to generate a set of the second ranked candidate segment masks;
selecting a second mask of the set of the second ranked candidate segment masks; and
training the neural network by applying the second mask of the set of the second ranked candidate segment masks to the neural network.

16. A method as claim 9 recites, wherein an object in at least one of the candidate segment masks is assigned a label representing at least one of a semantic category or background.

17. A method as claim 16 recites, further comprising updating the label during training.

18. A computer storage media having computer-executable instructions thereupon that, when executed by a computer, cause the computer to:
receive an input image comprising a ground-truth bounding box;
generate candidate segment masks based on the input image; and
perform a training operation comprising:
ranking the candidate segment masks to generate ranked candidate segment masks,
selecting a set of the ranked candidate segment masks to generate a set of the ranked candidate segment masks,
randomly selecting a mask of the set of the ranked candidate segment masks as a selected mask, and
training a neural network by applying the selected-mask of the set of the ranked candidate segment masks to the neural network.

19. A computer storage media as claim 18 recites, further comprising computer-executable instructions thereupon that, when executed by the computer, cause the computer to:
assign a label to an object in at least one of the candidate segment masks; and
update the label during the training operation.

20. A computer storage media as claim 18 recites, further comprising computer-executable instructions thereupon that, when executed by the computer, cause the computer to:
receive the mask of the set of the ranked candidate segment masks to generate second ranked candidate segment masks,
select a set of the second ranked candidate segment masks to generate a set of the second ranked candidate segment masks,
select a second mask of the set of the second ranked candidate segment masks, and
train the neural network by applying the second mask of the set of the second ranked candidate segment masks to the neural network.

* * * * *